United States Patent [19]
Whitten et al.

[11] Patent Number: 6,138,252
[45] Date of Patent: *Oct. 24, 2000

[54] GRAPHICAL TEST PROGRESS MONITOR

[75] Inventors: Thomas G. Whitten; Stephen C. Talley, both of Colorado Springs, Colo.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/674,356

[22] Filed: Jul. 1, 1996

[51] Int. Cl.⁷ .................................................. G06F 11/00
[52] U.S. Cl. .............................................. 714/46; 714/25
[58] Field of Search ........................ 395/183.22, 183.14, 395/183.15, 185.01, 183.13, 183.21, 972, 961, 966; 714/46, 25, 26, 31, 37, 39, 43, 47, 48

[56] References Cited

U.S. PATENT DOCUMENTS

| | | |
|---|---|---|
| 5,157,779 | 10/1992 | Washburn et al. ................. 395/575 |
| 5,325,377 | 6/1994 | Tuttle ................................... 371/67.1 |
| 5,432,942 | 7/1995 | Trainer ................................ 395/700 |
| 5,450,586 | 9/1995 | Kuzara et al. ...................... 395/700 |
| 5,495,578 | 2/1996 | Rohrbaugh et al. ............ 395/183.04 |
| 5,513,315 | 4/1996 | Tierney et al. .................. 395/183.13 |
| 5,528,753 | 6/1996 | Fortin ............................. 395/183.11 |
| 5,596,714 | 1/1997 | Connell .......................... 395/183.14 |

*Primary Examiner*—Nadeem Iqbal
*Attorney, Agent, or Firm*—Holland & Hart

[57] ABSTRACT

A method and computer system are presented for monitoring a suite of product tests as they are being performed. The tests are collected in named suites of tests. The method includes providing a display and graphically displaying names of suites that have been performed and that were passed on one region of the display and graphically displaying names of suites that have been performed and that were failed on another region of the display. The method also may include allowing a user to selectively identify a name of one of the suites that has been performed and displaying additional information on the display about the selectively identified suites. The additional information may include at least names of the tests within the suite that have been performed and that were passed or failed, and may include a journal record of the performance of the selectively identified. The display may be periodically updated in a period that may be selectively chosen or modified by the user.

24 Claims, 5 Drawing Sheets

```
/walkman/METATS/replace.out

=== 14:04 BEGIN: Loading configuration
=== 14:04 NOTE: SunOS walkman 5.5.1 on 596-gate:01/30/96 sun4m sparc
SUNW,SPARCstation-10
=== 14:04 PASS: Configuration loaded
=== 14:04 END: Loading configuration (rc-0 f-0 p=1)
=== 14:04 BEGIN replace
=== 14:04 NOTE: SunOS walkman 5.5.1 on 596-gate:01/30/96 sun4m sparc
SUNW,SPARCstation-10
=== 14:04 NOTE: 1. replace a component with the same component
=== 14:04 PASS: /usr/opt/SUNWmd/sbin/metareplace/dev/md/dsk/d82/dev/dsk/c1t2cd0s1
/dev/dsk/c1t2d0s1
=== 14:04 NOTE: 2. replace a component with a used up component
=== 14:04 PASS: /usr/opt/SUNWmd/sbin/metareplace/dev/md/dsk/d82/dev/dsk/c1t2cd0s1
/dev/dsk/c1t2d0s2
=== 14:04 PASS: /usr/opt/SUNWmd/sbin/metareplace/dev/md/dsk/d82/dev/dsk/c1t2cd0s1
/dev/dsk/c1t2d0s3
=== 14:04 PASS: /usr/opt/SUNWmd/sbin/metareplace/dev/md/dsk/d82/dev/dsk/c1t2cd0s1
/dev/dsk/c1t2d0s4
=== 14:04 PASS: /usr/opt/SUNWmd/sbin/metareplace/dev/md/dsk/d82/dev/dsk/c1t2cd0s1
/dev/dsk/c1t2d0s5
=== 14:04 NOTE: 3. replace a component with a bogus component
=== 14:04 PASS: /usr/opt/SUNWmd/sbin/metareplace/dev/md/dsk/d82/dev/dsk/c1t2cd0s1
BlkDev
d:/walkman/METATS/replace.out
```

Fig. 5

GRAPHICAL TEST PROGRESS MONITOR

BACKGROUND OF THE INVENTION

1. Field of the Invention

This invention relates to improvements in computer software testing methods and apparatuses, or the like, and more particularly to improvements in computer software testing methods and apparatuses for interfacing suites of computer software tests to a user.

2. Relevant Background

Producers of software products generally test their products extensively to assure proper operation of their software products on as many various operating systems and computer models as are applicable and necessary. As software products become more lengthy and complex, however, the development of routines to test the software products have become of concern, especially considering the market demands of producing adequately tested software in reasonable amounts of time.

Typically, to develop a suitable test for a particular software product, a software test designer studies the product specifications, extracts a list of product features, and generates a number of "assertions" regarding the software product. An assertion is, for example, a specification of the behavior of the program, or part thereof, when it is operating properly.

For each assertion, the designer then develops a set of tests in the form of software that exercises as many as possible of the code blocks in the product to prove the validity of the assertions. Typically, a designer may generate hundreds, even thousands, of tests for a typical complex software product. The various tests are collected in sets of suites, or even subsuites, for application to the target software to be tested.

It will be appreciated that for a particular software product running tests on all possible combinations of computer models and operating systems on which the product may be run may require an enormous amount of testing time. Not uncommonly, for example, in modern software products which have thousands or hundreds of thousands of lines of code, running all of the test cases on a single operating system to prove all of the assertions throughout all of the code blocks and code paths within the product may take a number of weeks. As software products become more and more complex, it can be expected that this time will become even larger. When this time is multiplied by the total number of operating systems and computer models on which the product is to be tested, it can be seen that an enormous amount of time is required for product testing, which translates into significantly increased production cost for the product.

During the running of the various test suites required to test a particular target software application, it is difficult to tell how well the tests are progressing. For instance if a test suite has been running for 30 hours, it is difficult to tell which and how many tests have passed or failed without retrieving and examining the journal files for all of the tests. Moreover, it is not uncommon to have tests running concurrently on many machines. This makes the task of knowing the status of tests at any particular moment even more monumental.

SUMMARY OF THE INVENTION

The invention provides a graphical tool, referred to herein as a test progress monitor. When the test progress monitor is started, it gives a two column display to indicate the status of completed test suites for the specified machine. In a preferred embodiment, the left column displays a list of suites which have completed successfully, and the right column shows the suites in which one or more tests have failed. The display is updated periodically, so it always shows a nearly current status of the test process.

If the test engineer desires more information about a failing suite, the engineer can select that suite, for example with a pointing device. The test progress monitor will then present a new display showing additional details for the specified suite. Preferably, the test progress monitor will show for the identified suite passing tests on the left and failing tests on the right. The engineer can then obtain more information about any test by selecting the test with the pointing device. The test progress monitor will then display the journal information for the failing test.

One of the advantages of the test progress monitor is that the test engineer is enabled to know the status of a test run at a glance. Since the display is updated periodically, it is virtually current. In addition the test progress monitor allows the test engineer to quickly focus on failing tests to gain more information about them.

Thus, according to a broad aspect of the invention, a computer program product is presented. The computer program product has a computer useable code storage medium and computer readable code embodied in the storage medium for causing a display of names of at least passing and failing suites of tests being performed on a target product. The computer readable code includes computer readable program code devices configured to cause a computer to effect a display on a first portion of the display of names of suites containing tests which all have been passed by the target product. The computer readable program code also includes computer readable program code devices configured to cause a computer to effect a display on a second portion of the display of names of suites containing tests at least some of which have been failed by the target product.

Additionally, if desired, the computer program code may also include computer readable program code devices configured to cause a computer to effect a display of names of tests which have been failed by the target product in a user selected one of the suites containing tests at least some of which have been failed by the target product, and computer readable program code devices configured to cause a computer to effect a display of a journal record of a user selected test that has been performed on the target product. Computer readable program code devices may also be included which are configured to cause a computer to effect an automatic periodic update of the display of suite names, or alternatively, to effect a user initiated update of the display of suite names.

According to another broad aspect of the invention, a method is presented for monitoring a suite of product tests as they are being performed. The tests are collected in named suites of tests. The method includes providing a display and displaying names of suites that have been performed and that were passed on one region of the display and displaying names of suites that have been performed and that were failed on another region of the display.

The method also may include allowing a user to selectively identify a name of one of the suites that has been performed and displaying additional information on the display about the selectively identified suites. The additional information may include at least names of the tests within the suite that have been performed and that were passed or failed, and may include a journal record of the performance of the selectively identified test. The display may be periodically updated in a period that may be selectively chosen or modified by the user.

According to another broad aspect of the invention, a method is presented for providing for dynamically monitoring an execution of suites of product tests. The method includes providing for periodically monitoring the execution of the suites and for displaying on one region of a display names of the suites that have been performed and that were passed providing for displaying on another region of the display names of suites that have been performed and that were failed.

The method may also include providing for allowing a user to selectively identify a name of a suite that has been executed, and providing for displaying additional information on the display about the selectively identified suite. Such additional information may include at least names of tests within the selectively identified suite that have been performed and that were passed and at least names of the tests within the selectively identified suite that have been performed and that were failed.

According to another broad aspect of the invention, a test progress monitor for use in conjunction with tests upon a target software program is presented. The tests are collected into named suites of tests which are performed on a digital computer, and a display is driven in response to signals from the computer. A computer useable medium has computer readable code embodied therein for operating the computer to display at least two columns to indicate the status of completed test suites for a specified machine a first column of the display showing a periodically updated list of names of suites containing tests which have completed successfully, and a second column of the display showing a periodically updated list of names of suites containing tests which have failed.

The monitor may include an automatic display updating function to periodically update the lists of names of suites containing tests which have passed and failed. The update may be automatically periodically actuated, or selectively immediately actuated. The details of the passed or failed tests may be selectively identified for journal information for the tests which have failed.

BRIEF DESCRIPTION OF THE DRAWINGS

The aforementioned and other features of the invention and the manner of attaining them will become more apparent, and the invention itself will be best understood, by reference to the following description of a preferred embodiment take in conjunction with the accompanying drawings, wherein:

FIG. 5 is a representation of a screen or display showing a journal record of a test selected from the list of passed and failed tests of FIG. 4.

In the various figures of the drawing, like reference numbers are used to denote like or similar parts.

DESCRIPTION OF THE PREFERRED EMBODIMENTS

Figure 1:
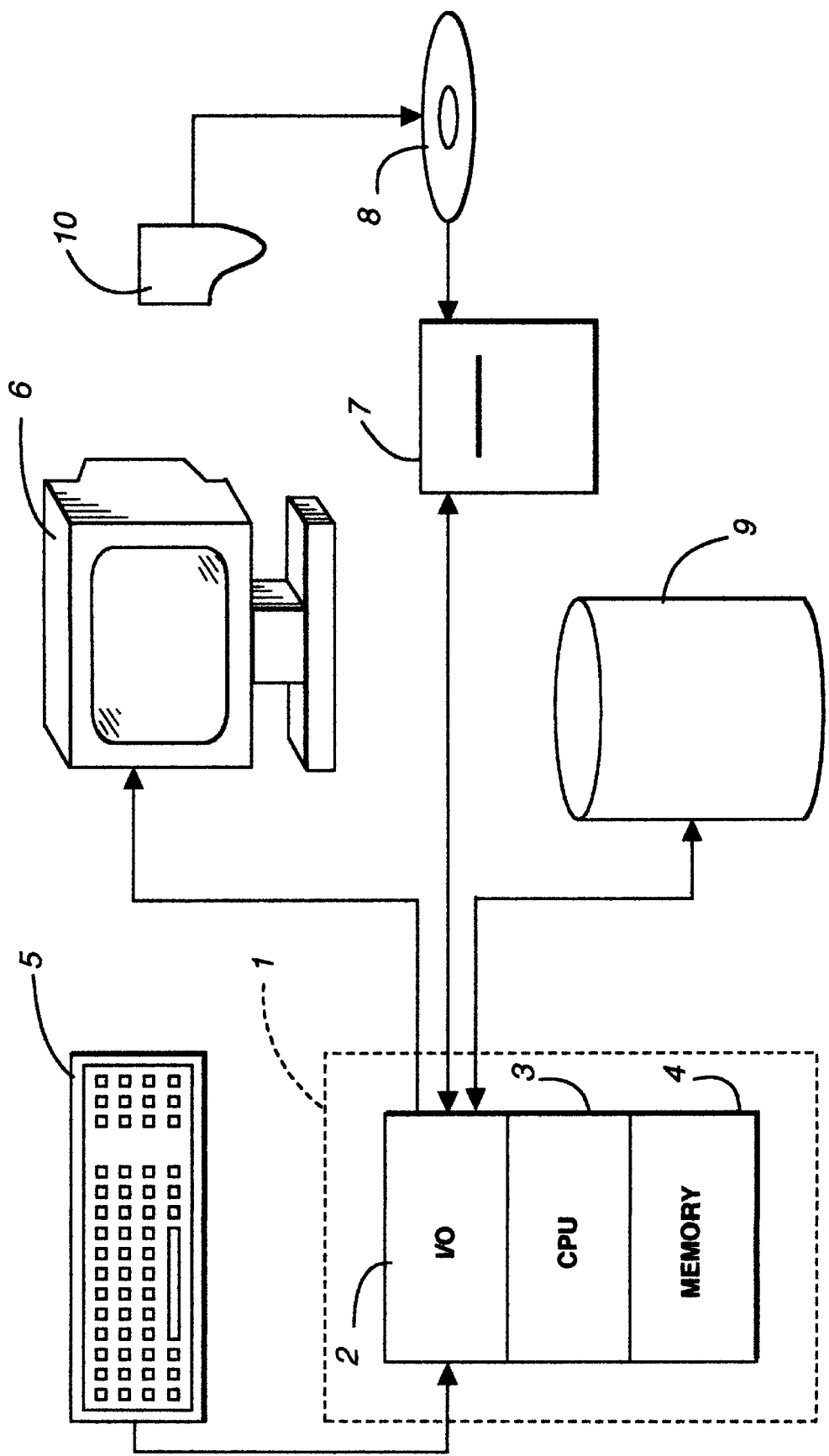
FIG. 1 is a block diagram of a computer system, which may be a part of a networked computer system, showing one environment in which the method and apparatus of the invention may be employed.

The environment in which the present invention is used encompasses a general distributed computing system, wherein general purpose computers, workstations, personal computers, or the like are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage 9, and a CD-ROM drive unit 7. The CD-ROM drive unit 7 can read a CD-ROM medium 8, which typically contains programs 10 and data. The computer program products containing mechanisms to effectuate the apparatus and methods of the present invention may reside in the memory section 4, or on a disk storage unit 9, or on the CD-ROM medium 8 of such a system.

Figure 2:
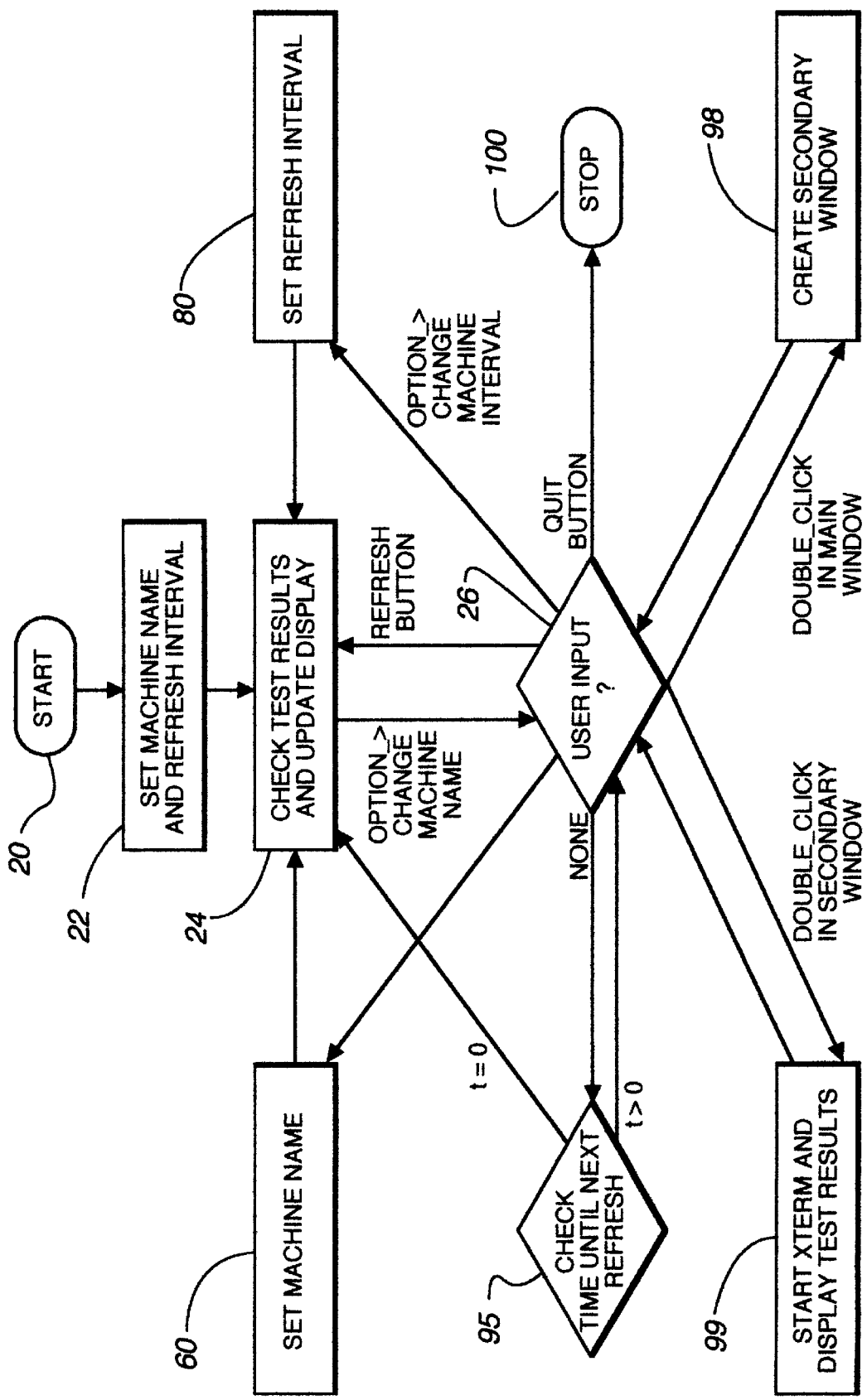
FIG. 2 is a flow diagram showing a computer implemented method for monitoring the progress of a suite of test cases in testing a target software application, according to the invention.

A flow chart for implementing a test progress monitor, in accordance with a preferred embodiment of the invention, is shown in FIG. 2. It should be noted that the test progress monitor preferably is provided as a software program or application that runs concurrently with the test program which tests a target software application. The target software application may be tested, for example, on different computers, different operating systems, and in different environments in which the target software application may be employed.

Thus, after an initial start state 20, the test progress monitor is set to monitor a particular machine on which test suites are being run. The machine name corresponds to the machine on which the suite of tests are run to test the target software application. In addition, a refresh interval also is established, as denoted by box 22. The refresh interval corresponds to the frequency at which the display is updated to show the status of the tests being performed and the summary of suites in which the tests are collected. The machine name and refresh interval values set in box 22 may be later changed by the user, as desired, as will become apparent below. It should be also noted that the term "refresh" is used herein interchangeably with the term "update" to mean a check of the journal entries created during the concurrent running of a suite of tests, so that the displayed results are current as of the most recent update. As will become apparent, a typical "update" or "refresh" interval may be one minute, 30 seconds, or other desired time.

It should be noted that the test progress monitor can be used in conjunction with a number of concurrently operating test suites on a corresponding set of different machines, which may be individually identified on a computer network. It is also noted that the results are updated with respect to the specific machine which has been identified, at the interval which has been selected at setup, box 22.

After the machine name has been identified and the refresh interval has been set, the test progress monitor then begins to check the test results that are accruing on the identified machine, and displays the results on a display device, as shown in box 24. The display device may be a graphical display device, if desired, such graphical display devices being well known in the art, and are not described further herein.

Periodically, user inputs may be received, as indicated by diamond 26. The various user inputs may be provided from a user menu (not shown) or from the actuation of "push buttons" presented on a graphical user interface through the use of a pointing device. Thus, with additional reference now to FIG. 3, as the test progress monitor is running, a graphical display 30 is generated on which a list 32 of suites of tests which have all passed are listed on one side of the display, and on which a list 34 of suites of tests in which at least one test has failed is listed on another portion of the display 30. The particular display 30 additionally indicates the currently selected refresh interval 36, and the identification of the currently selected test being test machine selected 38. Finally, the display 30 includes user selectable "push buttons" 40 to exit the test progress monitor. If the user needs an instantaneous refresh, a instantaneous "push button" 42 is also provided.

Figure 4:
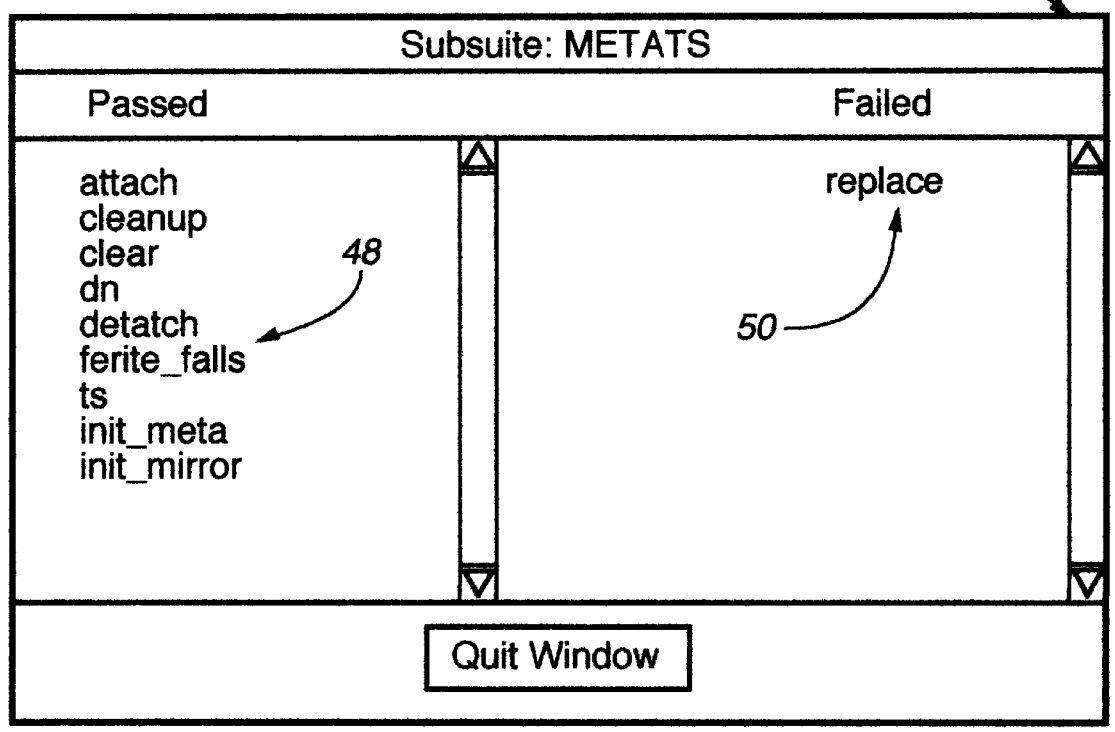
FIG. 4 is a representation of a screen or display of passed and failed tests in a suite selected from the display shown in FIG. 3.

As noted, each of the suites listed as passed 32 or failed 34 represent a collection of individual named tests that have been or are being performed on a target software program. Any of the suites in the passed 32 or failed 34 columns can be selected by a user with a pointing device, or the like, to specify a selected test that has either passed or failed within the respectively selected suite. When a suite is selected by the user, another window is defined having a display 45 as shown in FIG. 4.

The window display 45 also has two columns, respectively for passed tests 48 and failed tests 50, which are listed in the respective columns. In the embodiment illustrated, for example, the display 45 in FIG. 4 is generated in response to a user having selectively identified the failed suite METATS from the display of FIG. 3. As shown, a "Quit Window" "push button" is provided in the display 45 for selective activation by the user to return to the display of passed and failed suites 30 shown in FIG. 3.

On the other hand, the user can selectively identify one of the tests listed in the respective passed and failed lists 48 and 50 to display the journal entries that are produced by the test in its execution upon the target software application. An example of a screen 55 displaying typical journal entries that might be seen is shown in FIG. 5.

Figure 3:
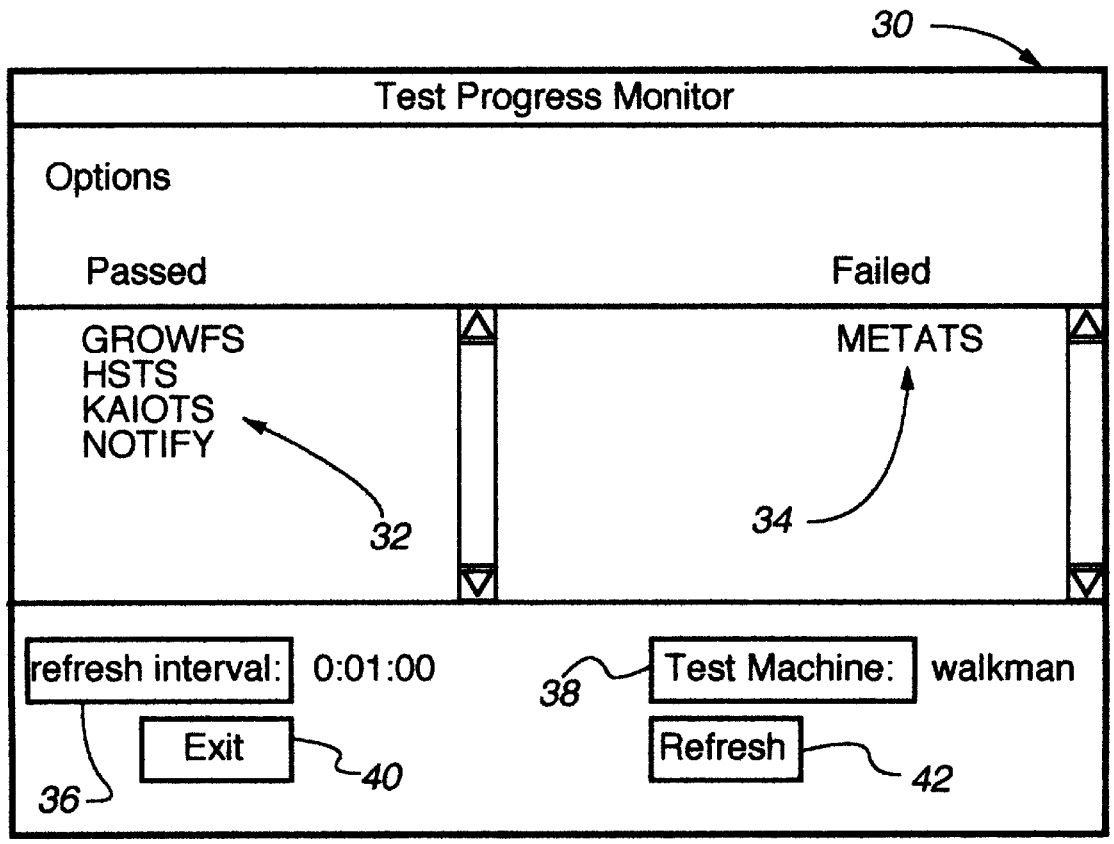
FIG. 3 is a representation of a screen or display showing lists of passed and failed test suites.
Figure 6:
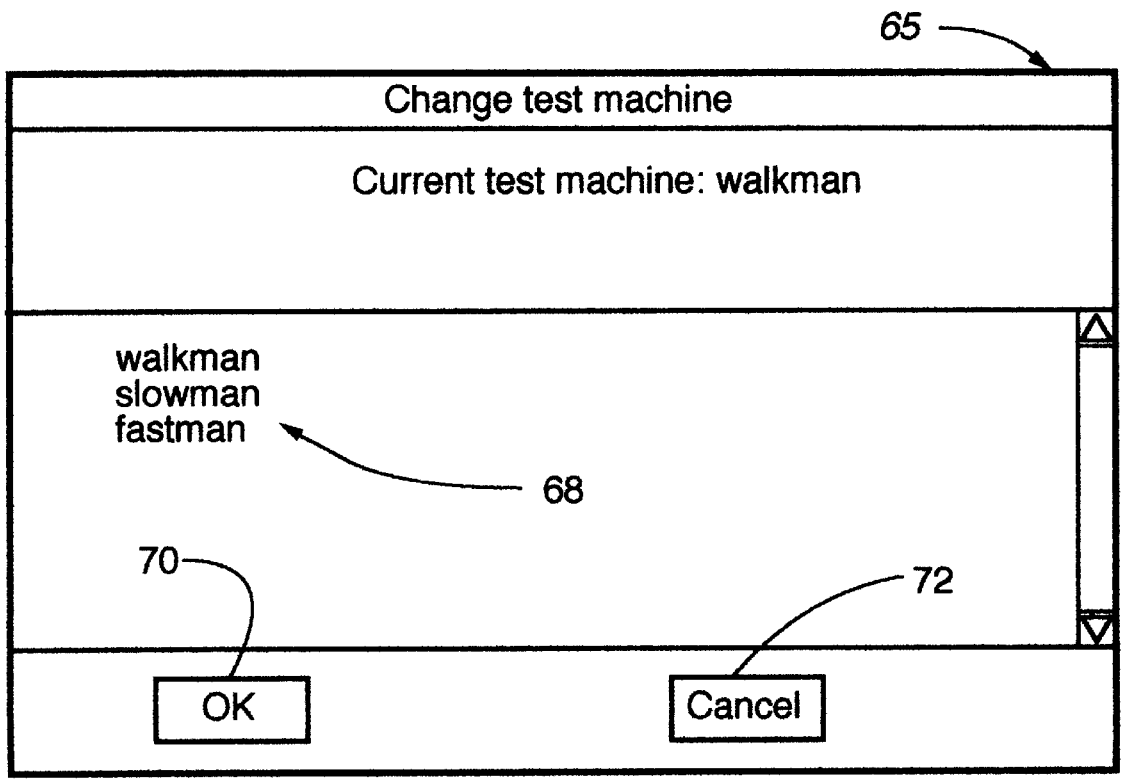
FIG. 6 is a representation of a screen or display showing the machine on which the target software is being tested in the running of the suites of tests, which also provides for selective identification by a user of another machine.

With reference again to FIGS. 2 and 3, the user may input various options during the execution of the test monitor program, as indicated by the diamond 26 in FIG. 2. Thus, for example, if the user wishes to select a different machine on which he desires to monitor the progress of tests upon a target software application, the user would selectively activate the "test machine" button 38 on the screen 30, as shown in FIG. 3. That action would enable the user to set or reset the machine name, as indicated by the box 60 in FIG. 2, and would cause another display 65 to be generated and displayed, as shown in FIG. 6. The screen 65 presents a list 68 of machines on which tests are being or have been run and which can be selected for progress monitoring using the test progress monitor application of the invention. The particular machine that is selected for monitoring is determined by the user selectively pointing to and selecting one of the names from the list 68. Once the machine has been selected, the user may point to an "OK" button 70, in which case the selected machine is set for monitoring or the cancel button 72 in which no change is made. In either event whether the "OK" button 70 or the "cancel" button 72 are activated, control is returned to the user input selection portion of the test progress monitor, as shown by the diamond 26 in FIG. 2. The display 30 shown in FIG. 3 is then again presented.

Figure 7:
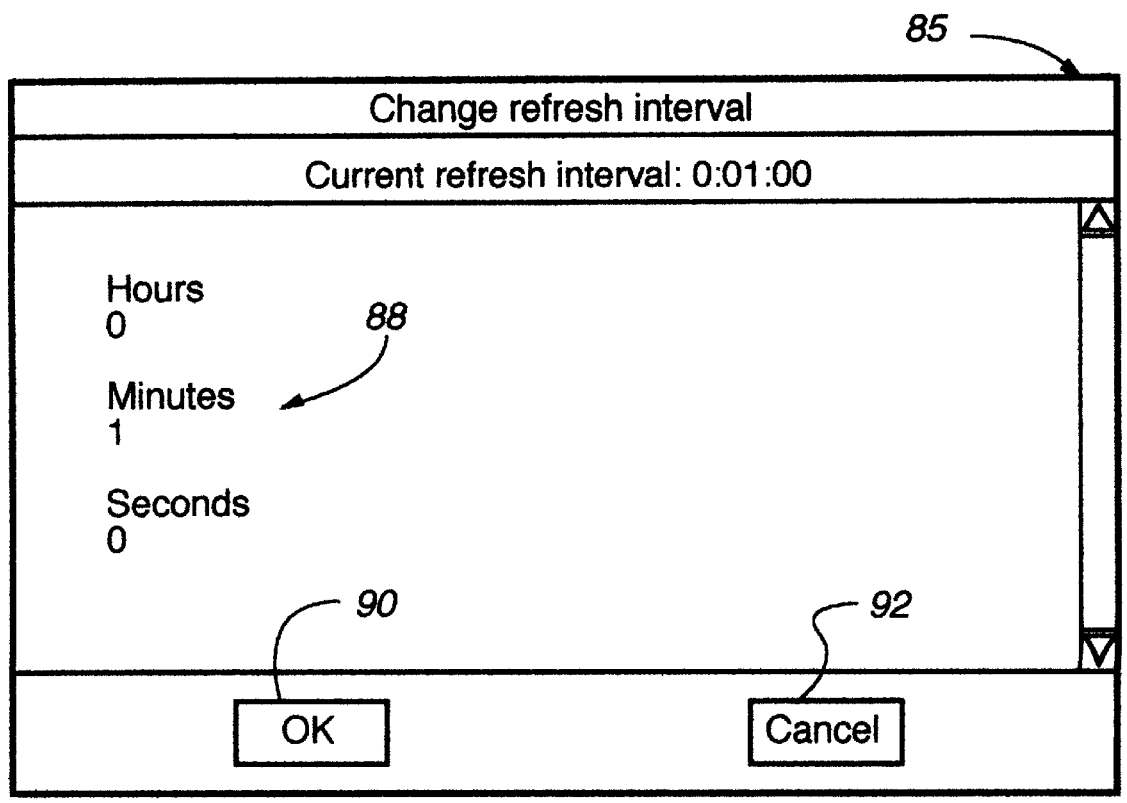
FIG. 7 is a representation of a screen or display showing the refresh or update interval of the display, and by which the interval can be changed by a user.

Another of the options that the user may select is to set or reset the refresh interval of the test updating. This is indicated by box 80 in FIG. 2, and is initiated by the user pushing the push button 36 shown in FIG. 3. Activation of the refresh interval push button 36 generates a change refresh interval window that is displayed on a display 85 shown in FIG. 7. The user may selectively enter the desired refresh rate in the hours, minutes, and second fields 88 of the display 85. After the refresh interval fields have been entered, the user may approve the entries by selecting the "OK" push button 90, or may cancel the selection by activation of the cancel button 92 on the display 85. In either event, again, control returns to the user input query diamond 26 in FIG. 2 and the display of 30 of FIG. 3.

Additional user selections may be provided, as indicated with reference again to FIG. 2. For example, the user may be provided with an option to check a time remaining until the next refresh operation, indicated by the diamond 95. The user alternatively may be provided with an option of creating secondary windows, box 98, by which a plurality of different functions of the test progress monitor (or other application) may be simultaneously viewed. If a secondary window 98 is created, for instance, the user may start a concurrent monitoring of other tests being run, indicated by the box 99 with the results being displayed in the secondary window. Finally, if desired the user may quit or exit the test progress monitor application entirely in a stop state 100.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A computer program product for monitoring progress of suites of tests being performed upon a target product, comprising:

a computer useable code storage medium;

a computer readable code embodied in said storage medium for causing a display of names of at least passing and failing suites of tests being performed on the target product, the computer readable code comprising:

computer readable program code devices configured to cause checking at selected intervals of results of the tests being concurrently performed upon the target product as the results of the tests accrue during performance of the tests upon the target product, the results of individual ones of the tests indicating the tests performed upon the target product either to have passed or to have failed;

computer readable program code devices configured to cause a computer to effect a display on a first portion of the display of a list of names of suites containing tests concurrently performed upon the target product as the results of the tests accrue during the performance of the tests upon the target product which all have been passed by the target product; and computer readable program code devices configured to cause a computer, concurrent to the display of the list of the names of the suites containing the tests which all have been passed by the target product, to effect a display on a second portion of the display of a list of names of suites containing tests concurrently performed upon the target product as the results of the tests accrue during the performance of the tests upon the target product, at least some of which have been failed by the target product, thereby to monitor progress of the test.

2. The computer program product of claim 1 further comprising computer readable program code devices configured to cause a computer to effect a display of names of tests which have been failed by the target product in a user selected one of said suites containing tests at least some of which have been failed by the target product.

3. The computer program product of claim 2 further comprising computer readable program code devices configured to cause a computer to effect a display of a journal record of a user selected test that been performed on the target product.

4. The computer program product of claim 1 further comprising computer readable program code devices configured to cause a computer to effect a display of names of tests which have been passed by the target product in a user selected one of said suites containing tests which all have been passed by the target product.

5. The computer program product of claim 1 further comprising computer readable program code devices configured to cause a computer to effect a periodic update of said display of suite names.

6. The computer program product of claim 1 further comprising computer readable program code devices configured to cause a computer to effect a user initiated update of said display of suite names.

7. A test progress monitor for use in conjunction with tests upon a target software program, said tests being collected into named suites of tests which are performed on a digital computer, comprising:
  a display driven in response to signals from said computer;
  a computer useable medium having computer readable code embodied therein for checking at selected intervals results of the tests being concurrently performed upon the target software program as the results of the tests accrue during performance of the tests upon the target product, the results of individual ones of the tests indicating the test performed upon the target product either to have passed or to have failed;
  a computer useable medium having computer readable code embodied therein for operating said computer to display at least two columns to indicate the status of completed test suites for a specified machine;
  a first column of said display showing a periodically updated list of names of suites containing tests which have completed successfully; and
  a second column of said display showing a periodically updated list of names of suites containing tests which have failed, thereby to monitor progress of the test.

8. The test progress monitor of claim 7 further comprising an automatic display updating function to periodically update said lists of names of suites containing tests which have passed and failed.

9. The test progress monitor of claim 7 further comprising an immediate display updating function that is selectively actuatable by a user for presenting an updated display of names of suites containing tests which have passed and failed.

10. The test progress monitor of claim 7 further comprising means by which a user can selectively display journal information for the tests which have failed.

11. A method for monitoring a suite of product tests as said product tests are being performed upon a target product, said tests being performed by a plurality of named software tests collected in named suites of said tests, comprising:
  checking at selected intervals results of the product tests being concurrently performed upon the target software program as the results of the tests accrue, the results of individual ones of the tests indicating the tests either to have passed or to have failed;
  providing a display;
  displaying names of suites that have been performed and that were passed on one region of the display as the results of the tests accrue during performance of the tests upon the target product; and
  displaying names of suites that have been performed and that were failed on another region of the display as the results of the tests accrue during performance of the tests upon the target product, thereby to monitor progress of the test.

12. The method of claim 11 further comprising:
  allowing a user to selectively identify one of the names of suites that have been performed;
  and displaying additional information on said display about said one of the suites selectively identified by said user.

13. The method of claim 12 wherein said step of displaying additional information on said display about said one of the suites selectively identified by said user comprises displaying on said display at least names of said tests within said suite that have been performed and that were failed.

14. The method of claim 12 wherein said step of displaying additional information on said display about said one of the suites selectively identified by said user comprises displaying a journal record of the performance of the said one of the suites selectively identified by said user.

15. The method of claim 11 further comprising periodically updating said steps of displaying names of suites that have been performed.

16. The method of claim 15 further comprising changing a period for said step of comprising periodically updating said steps of displaying names of suites that have been performed.

17. The method of claim 11 further comprising providing for a user to manually update said steps of displaying names of suites that have been performed.

18. A method providing for dynamically monitoring an execution of suites of product tests, comprising:
  providing for periodically monitoring the execution of said suites;
  providing for displaying on one region of a display names of said suites that have been performed and that were passed;
  and providing for displaying on another region of said display names of suites that have been performed and that were failed.

19. The method of claim 18 further comprising:
  providing for allowing a user to selectively identify a name of a suite that has been executed;
  and providing for displaying additional information on said display about said selectively identified suite.

20. The method of claim 19 wherein said step of providing for displaying additional information about selectively identified suite comprises providing for displaying on one region of said display at least names of tests within said selectively identified suite that have been performed and that were passed, and for displaying on another region of said display at least names of said tests within said selectively identified suite that have been performed and that were failed.

21. The method of claim 19 wherein said step of providing for displaying additional information on said display comprises providing for displaying a journal record of the performance of the said product tests.

22. The method of claim 18 further comprising providing for periodically updating said steps of displaying names of suites that have been performed.

23. The method of claim 22 further comprising providing for changing a period for said updating said steps of displaying names of product tests that have been performed.

24. The method of claim 22 further comprising providing for allowing a user to manually update said steps of displaying names of product tests that have been performed.

* * * * *

UNITED STATES PATENT AND TRADEMARK OFFICE
CERTIFICATE OF CORRECTION

PATENT NO. : 6,138,252
DATED : October 24, 2000
INVENTOR(S) : Whitten, Thomas G. et al.

It is certified that error appears in the above-identified patent and that said Letters Patent is hereby corrected as shown below:

<u>Column 7,</u>
Line 56, after "updated list", insert -- as the results of the tests accrue during the performance of the tests upon the target product, the list comprised --.

Line 59, after "updated list", insert -- as the results of the tests accrue during the performance of the tests upon the target product --.

Signed and Sealed this

Eighteenth Day of December, 2001

*Attest:*

*Attesting Officer*

JAMES E. ROGAN
*Director of the United States Patent and Trademark Office*